April 24, 1951  J. G. REID, JR  2,550,428
CONTROLLED ABSORPTION REFRIGERATION SYSTEM
Filed Dec. 18, 1946  2 Sheets-Sheet 2

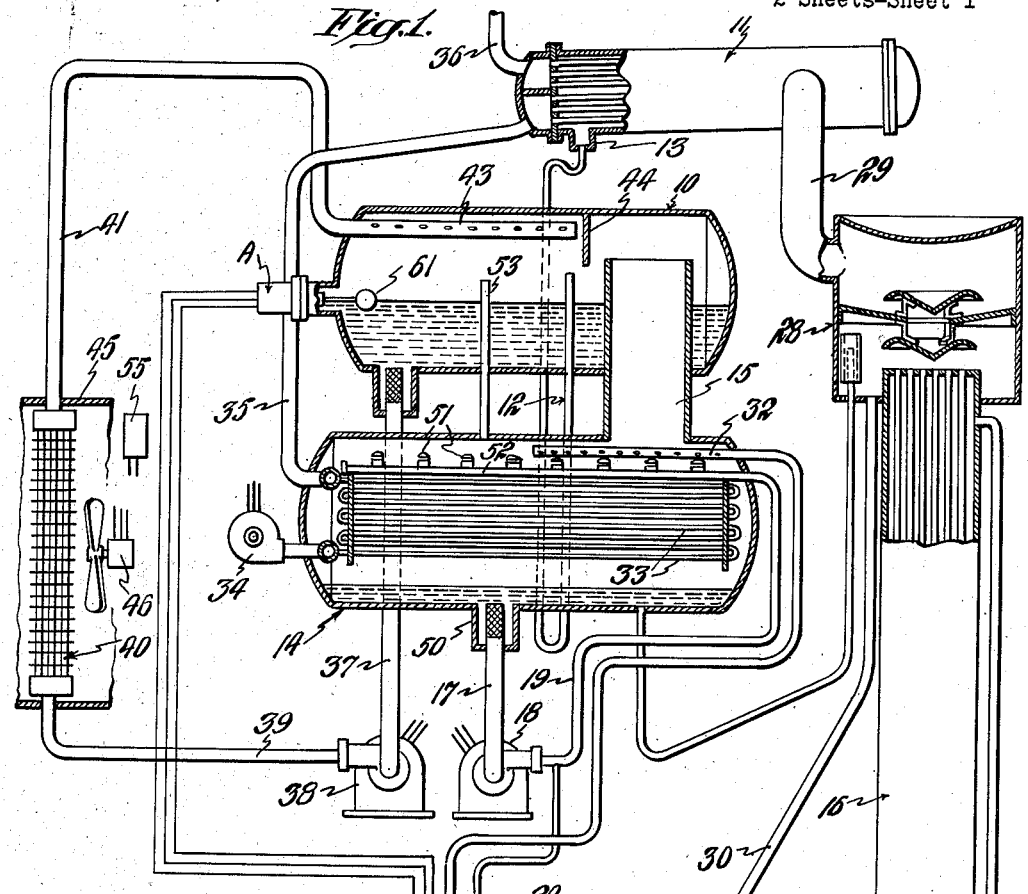

INVENTOR.
John G. Reid Jr.
BY Oliver S. Titcomb
his ATTORNEY

Patented Apr. 24, 1951

2,550,428

UNITED STATES PATENT OFFICE 2,550,428

CONTROLLED ABSORPTION REFRIGERATION SYSTEM

John G. Reid, Jr., Evansville, Ind., assignor to Servel, Inc., New York, N. Y., a corporation of Delaware Application December 18, 1946, Serial No. 716,993

10 Claims. (Cl. 62—5)

The present invention is directed to controls for refrigeration systems and relates back to my prior application Serial No. 586,731 filed April 5, 1945, now Patent No. 2,502,104, and entitled Refrigeration for all common subject matter.

While the present invention may be used with other refrigeration systems it is particularly adapted for an absorption refrigeration system of the type in which a body of refrigerant is accumulated in an evaporator and periodically circulated through a cooling element remote from the evaporator. When heat is supplied at a constant rate to such a system the amount of refrigerant accumulating in the evaporator is directly effected by the heat load on the system so that with light loads the amount of refrigerant increases and at heavy loads the amount of refrigerant decreases. As the amount of refrigerant out of solution increases, the difficulty in separating refrigerant from solution increases with a resultant loss of useful heat supplied for this purpose. An overflow pipe may be provided to limit the amount of refrigerant in the evaporator but the overflow of refrigerant from the evaporator also represents a heat loss in the system.

Furthermore, in an absorption refrigeration system of the type illustrated in my prior application, referred to above, the generator is heated by steam supplied to a heating chamber vented to the atmosphere to maintain the steam at atmospheric pressure and a constant temperature of 212° F. If insufficient steam is supplied to completely fill the heating chamber the system will not produce its maximum refrigerating capacity and if an excess amount of steam is supplied to insure complete filling of the heating chamber a part of the steam may escape through the vent which also constitutes a heat loss in the system.

One of the objects of the present invention is to vary the rate of operation of a refrigeration system in accordance with the amount of refrigerant in the evaporator of the system.

Another object is to regulate the amount of heat supplied to an absorption refrigeration system in accordance with the amount of refrigerant in the evaporator to operate the system at varying capacities with the most economical heat input.

Another object is to provide a control for regulating the amount of heat supplied to an absorption refrigeration system so as to utilize all of the available heat supplied from minimum to maximum capacity.

Another object is to provide a control for supplying heat to an absorption refrigeration system in inverse proportion to the amount of refrigerant in the evaporator to maintain the amount of refrigerant out of solution within predetermined limits.

Still another object of the invention is to provide a control for modulating the amount of heat supplied to an absorption refrigeration system in response to variations in the liquid level of the refrigerant in the evaporator to vary the amount of heat supplied in inverse proportion to the amount of refrigerant in the evaporator.

These and other objects will become more apparent from the following description and drawings in which like reference characters denote like parts throughout the several views. It is to be expressly understood, however, that the drawings are for the purpose of illustration only and not a definition of the limits of the invention, reference being had for this purpose to the appended claims. In the drawings:

Fig. 1 is a diagrammatic view of an absorption refrigeration system incorporating the control elements of the present invention;

Fig. 2 is a part sectional view of the evaporator and showing the float-operated controller for varying the electrical resistance of a rheostat in response to variations in the liquid level in the evaporator.

Figure 3:
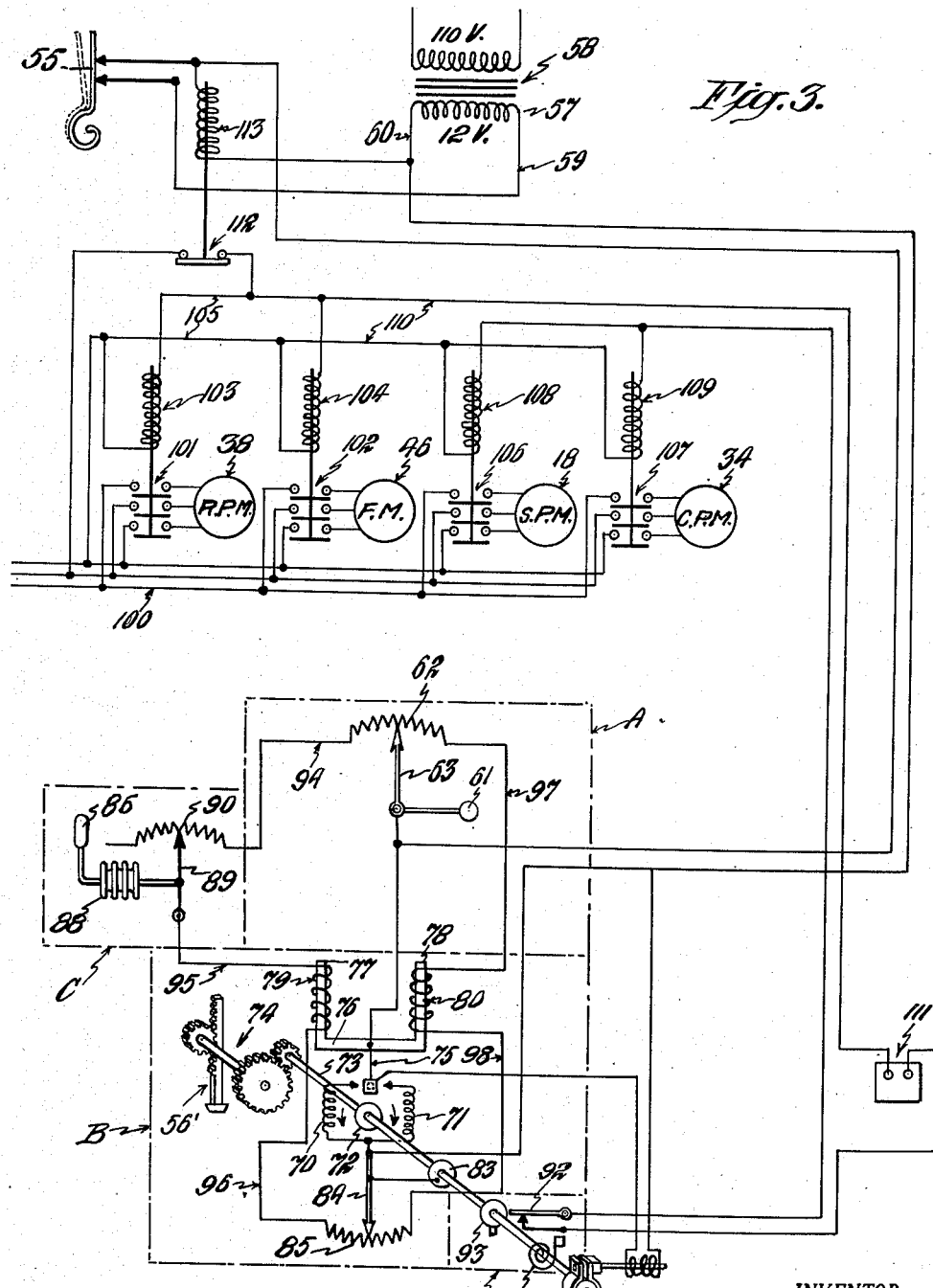
Fig. 3 is a diagrammatic view of an electric circuit incorporating the control of the present invention for regulating the operation of the refrigeration system.

The absorption refrigeration system illustrated in Fig. 1 of the drawings is substantially identical with the system illustrated and described in the pending application for United States Letters Patent of Albert R. Thomas, Serial No. 560,214, filed October 25, 1944, now Patent No. 2,518,202, and entitled Refrigeration. The refrigeration system is of the vacuum type and utilizes water as a refrigerant and an aqueous solution of a hygroscopic salt such as lithium bromide as an absorbent. In such a system, liquid refrigerant is introduced into the evaporator 10 from a condenser 11 through a U-shaped tube 12. The evaporator 10 is in the form of a horizontally-arranged cylindrical drum and the U-shaped tube 12 has one end connected to a sump 13 at the bottom of the condenser 11 and its opposite end extended upwardly through the bottom of the evaporator. The refrigerant vapor evaporated in the evaporator 10 flows to an absorber 14 where the vapor is absorbed in absorption solution therein. The absorber 14 is also in the form of a horizontally-arranged cylindrical drum positioned directly below the evaporator 10. A pipe 15 extends upwardly from the top of the absorber 14 through the bottom of the evaporator 10 and for a considerable distance above the bottom to provide a stand-pipe therein. The stand-pipe 15 is adapted to exhaust refrigerant vapor from the evaporator 10 to the absorber 14 while maintaining a body of liquid refrigerant in the evaporator.

Absorption liquid enriched with refrigerant, or, in other words, a dilute salt solution, is conducted from the absorber 14 to the base of a generator 16 in a path of flow including a conduit 17, pump 18, conduits 19 and 20, liquid heat exchanger 21 and conduit 22. The generator 16 comprises a plurality of riser tubes 23 enclosed in an outer shell to provide a heating chamber 24 therebetween. Steam is supplied from any suitable source to the chamber 24 of the generator 16 through a conduit 25. The steam may be supplied under pressure from a metered service line as used in some cities or as exhaust from power or processing equipment or may be generated in a boiler particularly designed for use with the refrigeration system. An outlet vent pipe 26 is connected to the heating chamber 24 of the generator 16 adjacent its upper end to maintain the steam supplied thereto at atmospheric pressure and a constant temperature of 212° F. A condensate drain 27 also is provided adjacent the bottom of the chamber 24.

The heating of the riser tubes 23 by the steam causes refrigerant vapor to be expelled from the absorption solution and such expelled vapor is effective to raise the absorption solution in the tubes by gas or vapor lift action. The expelled vapor passes from the upper ends of the riser tubes 23 into a vapor separator 28 and thence flows through a conduit 29 to the condenser 11 where the vapor is liquefied. Liquid refrigerant formed in the condenser 11 flows through the U-shaped tube 12 to the evaporator 10, as explained above, to complete the refrigeration cycle.

The raised absorption solution from which refrigerant vapor has been expelled flows by gravity from the top of the generator 16 to the absorber 14 in a path of flow including a conduit 30, liquid heat exchanger 21 and conduit 31. The end of the conduit 31 extends into the upper portion of the absorber 14 adjacent the inlet from the stand-pipe 15 and has a plurality of apertures or nozzles therein to provide a distributing pipe 32 for dividing the absorption solution as it is introduced into the absorber to promote absorption of the refrigerant vapor. The heat liberated by the absorption of refrigerant vapor in absorber 14 is taken up by a cooling medium such as, for example, water which flows upwardly through a bank of vertically-disposed pipes or coils 33 in the absorber. The cooling water may be delivered under pressure into the lower ends of the bank of pipes 33 from a supply main or, as illustrated, may be delivered by an electrically-driven pump unit 34 from a well or cooling tower (not shown). The cooling water is discharged from the upper ends of the bank of pipes 33 in the absorber 14 through a conduit 35. Conduit 35 is connected to the condenser 11 so that the cooling water also may be utilized to effect cooling in the condenser. The cooling water is discharged from the condenser 11 through a conduit 36.

The system is initially evacuated and operates in a partial vacuum with the generator 16 and condenser 11 operating at one pressure and the evaporator 10 and absorber 14 operating at a lower pressure. The pressure differential between the high and low pressure sides of the system is maintained by a liquid column in the up-leg of the U-shaped tube 12 between a condenser 11 and evaporator 10. A similar liquid column is present in the conduit 31 connecting the absorber 14 and liquid heat exchanger 21. The pump 18 connected between the absorber 14 and liquid heat exchanger 21 also maintains the pressure differential between the absorber and generator 16.

The liquid refrigerant in the evaporator 10 is circulated periodically in an auxiliary loop circuit to adapt the system to refrigerate at a place remote from the evaporator. The loop circuit comprises a conduit 37, electrically-driven pump unit 38, conduit 39, cooling element 40 and conduit 41. As illustrated in Fig. 1 of the drawings, the end of the conduit 41 extends into the evaporator 10 and has a series of apertures or nozzles to provide a spray pipe 43 for dividing the liquid refrigerant as it is returned to the evaporator to promote evaporation. Preferably a baffle plate 44 is provided in the evaporator 10 between the end of the liquid distributing pipe 43 and the stand-pipe 15 to prevent the liquid refrigerant from being swept into the stand-pipe with the refrigerant vapor. The cooling element 40 is illustrated diagrammatically as a radiator having vertical tubes extending between upper and lower headers with fins extending across the tubes to promote heat transfer. When the refrigeration system is to be used for air conditioning, the cooling element or radiator 40 extends across a duct 45 and the air in the enclosure to be cooled is circulated over the radiator by a motor-driven fan 46.

The absorption solution in the absorber 14 also is circulated continuously through an auxiliary loop circuit to promote absorption of the refrigerant vapor. The auxiliary loop circuit for the absorption solution comprises the conduit 17, pump 18 and conduit 19. The upper end of the conduit 17 extends into a sump 50 in the bottom of the absorber 14 and the lower end of the conduit is connected to the inlet of the pump 18. Conduit 19 is connected at one end to the outlet from the pump 18 and its opposite end extends throughout the length of the absorber 14 adjacent the top thereof. A series of nozzles 51 are provided in the end portion of the conduit 19 extending into the absorber 14 to provide a liquid spray pipe 52 for dividing the absorption liquid into a fine spray as it is delivered to the absorber. During operation of the refrigeration system, part of the circulating absorption solution is diverted from the conduit 19 through the conduit 20 and liquid heat exchanger 21 to the generator 16 as previously described. The control of the present invention limits the amount of refrigerant that can accumulate in the evaporator 10 but an overflow by-pass tube 53 may be provided as a safety device between the evaporator 10 and absorber 14. As thus far described, the refrigeration system is substantially identical with the refrigeration system illustrated in the Thomas application referred to above.

In accordance with the present invention control mechanism is provided for starting and stopping the refrigeration system in response to variations in the ambient temperature of the enclosure to be cooled and regulating the rate of operation of the system in accordance with the amount of refrigerant in the evaporator 10. The starting and stopping of the refrigeration system is controlled by a thermostat 55 responsive to the ambient temperature to be controlled. While the thermostat 55 is shown in Fig. 1 as located adjacent the fan 46 it will be understood that the thermostat will be properly positioned to respond to the temperature of the ambient. The rate of operation of the system is variably controlled from zero to maximum capacity by a suitable modulating valve 56 in the steam supply line 25, see Fig. 1, having a movable valve element 56', see Fig. 3, which regulates the amount of heating steam supplied to generator 16.

A controller A responsive to the liquid level of the refrigerant in the evaporator 10 is connected to regulate the operation of a motor B for actuating the modulating valve 56. A controller C responsive to the escape of steam from the heating chamber 24 of the generator 16 also is connected to the motor B and modifies the regulation by the controller A to prevent overflow and waste of heating steam at maximum capacity. A controller D responsive to an open or closed position of the modulating valve 56 starts or stops the solution pump motor 18 and cooling water pump motor 34.

The controllers A, B, C and D are suitably connected to actuate the modulating valve 56 for automatically regulating the operation of the system and as illustrated in Fig. 3 they may be connected in a balanced electric circuit like that shown in my prior application Serial No. 586,731 referred to above. The electric circuit is connected across the secondary 57 of a step-down transformer 58 by conductors 59 and 60 and thermostat 55 is shown diagrammatically as an electric switch in the conductor 59 for energizing the circuit when the ambient to be cooled is above a predetermined temperature and deenergizing the circuit when the ambient is below a predetermined temperature.

As illustrated in Fig. 2 the controller A comprises a float 61 in the evaporator 10 which rises and falls with the liquid level of the refrigerant therein and a rheostat outside of the evaporator having a resistance element 62 and a movable contact 63. An arm 64 extends outwardly from the float 61 through an opening 65 in the evaporator 10 and is pivoted at 66 on a bracket 67. The movable contact 63 of the rheostat is mounted on an extension of the arm 64 beyond the pivot 66 so that movement of the float 61 in the evaporator 10 is translated to movement of the contact 63 on the resistance element 62. A flexible bellows 68 is provided between the float arm 64 and the casing of the evaporator 10 to hermetically seal the latter while permitting movement of the float arm. A bracket 69 surrounds the float arm 64 in the evaporator 10 to limit its range of movement. The arrangement of the controller A is preferably such that a relatively small change in the liquid level in the evaporator 10 will move the contact arm 63 from one end to the other of the resistance element 62.

The motor B is shown diagrammatically in the lower part of Fig. 3 as having two separate windings 70 and 71 for rotating an armature or rotor 72 in opposite directions. The movable element 56' of the valve 56 is connected to the armature shaft 73 of the motor B by suitable reduction gearing 74 so that rotation of the armature in one direction (clockwise) will cause the valve element to open and rotation of the armature in the opposite direction (counterclockwise) will cause the valve element to close. The windings 70 and 71 of the motor B are arranged in parallel and connected at one end to conductor 60 from the secondary 57 of a transformer 58. An electric circuit is completed through either one or the other of the windings by a tilting switch contact 75 electrically connected to the other conductor 59 from the transformer secondary. The tilting switch contact 75 depends from a U-shaped frame 76 pivotally mounted to rock from a neutral "off" position to one or other of its two "on" positions in contact with motor winding 70 or 71, respectively. The arms 77 and 78 of the U-shaped frame 76 are of magnetic material and extend into the magnetic field of a pair of relay coils 79 and 80. A spring 81 is connected to rotate the shaft 73 to close the valve element 56' when the control circuit is deenergized but a magnetic brake 82 restrains such movement when the circuit is energized. The magnet coil for the brake 82 may be connected in any suitable way and as illustrated in Fig. 3 is connected between the tilting contact 75 connected to the conductor 59 and the conductor 60. A crank arm 83 on the motor shaft 73 is connected to the movable contact 84 of a follow-up rheostat having a resistance element 85.

Controller C comprises a thermal responsive element 86 located in a well 87 in the steam vent pipe 26 from the heating chamber 24 of the generator 16, see Fig. 1, and a motor or bellows 88 connected to operate the movable contact 89 of a rheostat having a resistance element 90, see Fig. 3.

Controller D comprises an electric switch 92 operated by a cam 93 on the motor shaft 73 and the cam is so arranged as to close the switch immediately upon movement of the shaft to open the modulating valve 56 and open the switch upon the last increment of movement of the shaft to close the valve.

The relay coils 79 and 80 for actuating the tilting switch 75 are connected in the opposite sides of the balanced electric circuit comprising the resistance elements 62 and 90 of the controllers A and C and the resistance element 85 of the follow-up rheostat operated by the motor B. On one side of the balanced circuit one end of the resistance element 62 of the controller A is connected to one end of the resistance element 90 of the controller C by a conductor 94; the movable contact 89 of controller C is connected to one end of the relay coil 79 by a conductor 95; and the other end of the relay coil is connected to one end of the resistance 85 of the follow-up rheostat by a conductor 96. On the opposite side of the balanced electric circuit the opposite end of the resistance 62 of the controller A is connected to one end of the relay coil 80 by a conductor 97 and the other end of the relay coil is connected to the opposite end of the resistance 85 of the follow-up rheostat by a conductor 98. The movable contacts 63 and 84 of the controller A and follow-up rheostat are connected to the conductors 59 and 60 from the transformer secondary 57, respectively.

The refrigerant pump motor 39 and the motor of the fan unit 46 are connected to be energized by a three-phase power line 100 as controlled by switches 101 and 102. Switches 101 and 102 are operated by relay coils 103 and 104 arranged in parallel in a relay circuit 105 connected across a single phase of the three-phase power line 100. The solution pump motor 18 and cooling water pump motor 34 are also connected to be energized by the three-phase power line 100 as controlled by switches 106 and 107. Switches 106 and 107 are operated by relay coils 108 and 109 in a second relay circuit 110 including the controller D and a low temperature cut-out switch 111 responsive to the temperature of the refrigerant in the evaporator 10. The energization of both of the relay circuits 105 and 110 is controlled by a switch 112 which, in turn, is closed by a relay coil 113 connected between the conductor 59 beyond the thermostatic switch 55 and the conductor 60. One embodiment of the invention having now been described in detail the mode of operation is explained as follows.

For purposes of description let it be assumed that the thermostatic switch 55 is closed and movable contacts 63, 84 and 89 of the balanced electric circuit are in the position illustrated in Fig. 3. Such a condition indicates that the ambient in the enclosure to be cooled is above the temperature at which the thermostat 55 is adjusted and that the body of refrigerant R in the evaporator 10 is at an intermediate level between upper and lower limits. The relay circuit 105 is energized by the switch 112 and relay 113 so that the refrigerant pump 38 and fan 46 are operating to circulate refrigerant through the radiator 40 and circulate air over the radiator, respectively. The steam valve 56 is partially open so that steam is being supplied to the generator 16. The switch 92 of controller D is closed so that pump 18 is operating to circulate absorption solution in the absorber 14 and the cooling water pump 34 is operating to deliver cooling water to the absorber and condenser 11.

The balanced electric circuit is energized from the transformer secondary 57 through the conductor 59 and thermostatic switch 55 to the contact 63 of the controller A and through the conductor 60 to the contact 85 of the follow-up rheostat. As the resistance of the two sides of the balanced circuit are equal the relay coils 79 and 80 produce the same magnetic force on the arms 77 and 78 of the U-shaped frame so that the tilting contact 75 is at its neutral position and the motor windings 70 and 71 of the motor B are deenergized. The valve element 56' of the modulating valve 56 is held in its adjusted open position by the magnetic brake 82.

Refrigerant is being expelled from absorption solution in the tubes 23 of the generator 16 at a predetermined rate corresponding to the amount of steam being supplied by the valve 56. The refrigerant vapor is flowing through the conduit 29 into the condenser 11 where it is being condensed to a liquid and the liquid refrigerant is flowing by gravity through the U-shaped tube 12 to the evaporator 10. As the relatively high temperature air (85° F.) circulates over the surface of the radiator 40, heat is transferred to the relatively low temperature refrigerant (50° F.) in the radiator 40 which appears as sensible heat due to the pressure applied to the refrigerant by the circulating pump 38. The sensible heat in the liquid refrigerant causes part of the refrigerant to evaporate as it is sprayed into the low pressure evaporator 10 from the spray pipe 43. The evaporation of part of the refrigerant reduces the temperature of the unevaporated liquid refrigerant recirculated through the radiator 40.

The refrigerant vapor in the evaporator 10 flows through the stand-pipe 15 into the absorber 14 and is absorbed in the absorption solution therein. Recirculation of absorption solution in the absorber 14 and the delivery thereto of solution weak in refrigerant from the generator 16 promotes absorption so that a low vapor pressure and refrigerant temperature is maintained in the evaporator 10. Part of the recirculated absorbent is delivered to the generator 16 in a path of flow including the conduit 20, liquid heat exchanger 21 and conduit 22 to complete the refrigerant circuit.

If the heat load decreases so that less refrigerant is evaporated in the evaporator 10 the amount of refrigerant in the evaporator will tend to increase. As the amount of refrigerant in the evaporator 10 increases the liquid level will rise and operating through the float 61 will move the contact 63 of the controller A to the left as viewed in Fig. 3 to unbalance the resistance 62 in the electric circuit. With a decrease in the resistance on the left-hand side of the circuit as viewed in Fig. 3 more current will flow through relay coil 79 than will flow through the relay coil 80 causing the contact 75 to be tilted to the left and complete a circuit from the conductor 59 through the motor winding 70 and conductor 60. Energization of motor winding 70 causes the armature 72 to rotate counter-clockwise and operating through the reduction gearing 74 moves the valve element 56' toward closed position to reduce the amount of steam supplied to the generator 16 and thereby the rate of operation of the refrigeration system. Simultaneously the crank arm 83 on the motor shaft 73 actuates the movable contact 84 of the follow-up rheostat toward the right as viewed in Fig. 3 to again balance the electric circuit after an increment of movement corresponding to the movement of the float 61 so that the tilting contact 75 will move to its neutral position. The magnetic brake 82 produces less resistance than the torque of the motor B when energized so that the motor turns the shaft but produces sufficient resistance to hold the shaft in any adjusted position.

If the heat load decreases to such an extent as to completely close the modulating valve 56 the cam 93 will open the controller switch D to deenergize the relay circuit 110, open the switches 106 and 107 and stop the solution pump motor 18 and the cooling water pump motor 34. Also if the refrigerant in the evaporator falls below a predetermined temperature the low temperature cut-out switch 111 will open the relay circuit 110 to stop the pumps 18 and 34.

If the heat load increases a greater amount of refrigerant will be evaporated in the evaporator 10 and the liquid level will tend to fall. Upon a fall in the liquid level the float 61 of the controller A will move the contact 63 to the right as viewed in Fig. 3. Such movement of the contact 63 will unbalance the circuit on the opposite side so that a greater amount of current will flow through the relay coil 80 than through the relay coil 79 to actuate the tilting switch 75 toward the right. Such movement of the tilting contact 75 will then complete a circuit from the conductor 59 through the motor winding 71 and conductor 60. Upon energization of the motor winding 71 the motor will rotate clockwise and operating through the reduction gearing 74 will open the valve element 56' to supply more steam to the heating chamber 24 of the generator 16 and increase the rate of operation of the refrigeration system. Rotation of the shaft 73 operates the contact 84 of the follow-up rheostat to again balance the circuit after an increment of movement corresponding to the movement of the float 61.

Within the capacity of the unit the control of the present invention will maintain the liquid level and the amount of refrigerant in the evaporator within predetermined limits. As the controller A varies the resistance 62 in increments proportional to changes in the liquid level in the evaporator 10 and as the modulating valve 56 will be actuated in amounts proportional to the changes in resistance, the amount of steam supplied to the generator will be varied in inverse proportion to the amount of refrigerant in the evaporator. Thus, the control of the present invention limits the maximum amount of refrigerant out of solution so as to maintain the concentration of the solution within permissible limits.

If the heat load increases beyond the capacity of the refrigeration system the liquid level in the evaporator 10 will continue to fall and the controller A operating through the motor B will continue to open the modulating valve 56 to supply a maximum amount of steam to the heating chamber 24 of the generator 16. The system will then operate at maximum capacity and when steam escapes from the heating chamber 24 through the vent pipe 26 the controller C will be actuated to modify the action of the controller A and reduce the amount of steam supplied. When any steam escapes through the vent pipe 26 the temperature responsive element 86 will quickly expand the bellows 88 and move the arm 89 of the controller C toward the right as viewed in Fig. 3 to decrease the resistance in the left-hand side of the balanced circuit. A greater amount of current will then flow through the relay coil 79 to tilt the switch 75 and energize the motor winding 70 and rotate the motor shaft counter-clockwise to partially close the valve. Thus, the controllers A and C cooperate to supply steam to the heating chamber 24 to operate the system at maximum capacity without overflow and waste of the heating steam.

The control continues to operate in the manner described above to vary the amount of steam supplied to the generator 16 in inverse proportion to the amount of refrigerant in the evaporator 10 until the ambient to be cooled falls below a predetermined temperature at which the thermostat 55 is adjusted. The thermostat 55 then opens the electric circuit. Upon deenergization of the electric circuit the switch 112 is opened to deenergize the relay circuits 104 and 110 to stop operation of the refrigerant pump motor 38, fan motor 46, solution pump motor 18, and cooling water pump motor 34. Simultaneously the balanced electric circuit and magnetic brake 82 are deenergized and the spring 81 rotates the motor shaft 73 to close the valve 56. During the last increment of movement of the motor shaft 73 to close the valve element 56' the cam 93 opens the switch 92 in the relay circuit 110.

The entire control then remains inoperative until the temperature of the ambient again rises to close the thermostatic switch 55 and energize the electric circuit. Upon energization of the electric circuit the relay circuit 105 is energized to start the refrigerant pump 38 and fan motor 46 and the balanced electric circuit is energized to render the control operative to supply steam to the generator. When the liquid refrigerant in the evaporator 10 falls below a predetermined level the controller A will initiate operation of the motor B to partially open the valve 56. The first movement of the shaft 73 of the motor B closes the switch 92 of the controller D and energizes the relay circuit 110 to start operation of the solution motor pump 18 and cooling water pump 34. Thus, the refrigerant pump motor 38 and fan motor 46 are operated immediately upon closing of the thermostatic switch 55 and the solution pump motor 18 and cooling water pump motor 34 are operated when the steam valve 56 opens and stopped when the steam valve closes.

It will now be observed that the present invention provides a control for varying the rate of operation of a refrigeration system in accordance with the amount of refrigerant in the evaporator. It will further be observed that the present invention provides a control for regulating the amount of heat supplied to an absorption refrigeration system to operate the system from zero to maximum capacity with the most economical use of the available heat supplied. It will still further be observed that the present invention limits the amount of refrigerant out of solution whereby to control the concentration of the absorption solution.

While a single embodiment of the invention is herein illustrated and described it will be understood that changes may be made in the construction and arrangement of elements without departing from the spirit or scope of the invention. Therefore, without limiting myself in this respect the invention is defined by the following claims:

1. In combination, refrigeration apparatus including an evaporator, control means for starting and stopping a cycle of operation of the refrigeration apparatus and varying the rate of operation of the refrigeration apparatus during a cycle of operation, a controller responsive to a temperature affected by the evaporator and connected to actuate the control means for starting and stopping operation of the refrigeration apparatus, and a second controller responsive to the amount of refrigerant in the evaporator and connected to actuate the control means for regulating the rate of operation of the refrigeration apparatus.

2. In combination, absorption refrigeration apparatus including an evaporator, means for supplying heat to the refrigeration apparatus, a controller responsive to a temperature affected by the evaporator for rendering the heat supplying means operative and inoperative to supply heat to the refrigeration apparatus to start or stop a cycle of operation, and a second controller for regulating the heat supplying means to vary the amount of heat supplied to the refrigeration apparatus during a cycle of operation in response to variations in the amount of refrigerant in the evaporator.

3. In combination, absorption refrigeration apparatus including an evaporator, a modulating valve for regulating the amount of heat supplied to the refrigeration apparatus, a controller responsive to the temperature of the medium to be cooled for rendering the modulating valve operative and inoperative to supply heat to the refrigeration apparatus to start and stop a cycle of operation, and a second controller responsive to the level of refrigerant in the evaporator and connected to regulate the modulating valve during a cycle of operation to vary the amount of heat supplied to the refrigeration apparatus in inverse proportion to the amount of refrigerant in the evaporator.

4. In an air cooling system, absorption refrigeration apparatus comprising a plurality of elements including a generator and evaporator interconnected for the circulation of refrigerant, means for supplying heat to the generator for operating the apparatus to deliver refrigerant to the evaporator, a controller responsive to the amount of refrigerant in the evaporator and connected to regulate the heat supplying means to vary the amount of heat supplied to the generator in inverse proportion to the amount of refrigerant in the evaporator, a fan for circulating air to be cooled over the evaporator, and a second controller responsive to the temperature of the air for rendering the first controller operative to regulate the heat supplying means and initiate operation of the fan.

5. In an absorption refrigeration system comprising a plurality of elements including a generator and evaporator interconnected to circulate refrigerant, said generator having a heating chamber vented to the atmosphere, means for supplying steam to the chamber to heat the generator at a constant temperature, a modulating valve for varying the amount of steam supplied to the heating chamber of the generator, a controller responsive to the liquid level of the refrigerant in the evaporator and connected to actuate the valve to supply steam at a rate inversely proportional to the amount of refrigerant in the evaporator, and a second controller responsive to the temperature of steam escaping through the vent from the generator and connected to actuate the valve to reduce the amount of steam supplied to the heating chamber.

6. In an absorption refrigeration system comprising a plurality of elements including a generator and an evaporator interconnected for the circulation of refrigerant, said generator having a heating chamber, means for supplying steam to the heating chamber of the generator, a modulating valve for regulating the amount of steam supplied to the generator, said evaporator being adapted to maintain a body of liquid refrigerant therein, an auxiliary circuit including a cooling element and pump for recirculating the refrigerant in the evaporator, a float operated controller responsive to the liquid level of the refrigerant in the evaporator and connected to actuate the valve to vary the amount of steam supplied to the heating chamber of the generator in inverse proportion to the amount of refrigerant in the evaporator.

7. In an absorption refrigeration system comprising a plurality of elements including a generator, condenser, evaporator and absorber interconnected for the circulation of refrigerant, said generator having a heating chamber, means for supplying steam to the heating chamber of the generator, a modulating valve for regulating the amount of steam supplied to the generator, said evaporator being adapted to maintain a body of liquid refrigerant therein, an auxiliary branch circuit including a cooling element and pump for recirculating the refrigerant in the evaporator, an electric circuit including an electric motor for operating the modulating valve, a controller having a movable element for varying the electric circuit to cause the motor to actuate the valve in proportion to the movement of the element, and a float in the evaporator for actuating the movable element in response to variations in the liquid level of the refrigerant in the evaporator.

8. In an absorption refrigeration system comprising a plurality of elements including a generator and evaporator interconnected for the circulation of refrigerant, said generator having a heating chamber vented to the atmosphere, means for supplying steam to the chamber to heat the generator at a constant temperature, a modulating valve for varying the amount of steam supplied to the heating chamber of the generator, a controller responsive to the temperature of the medium to be cooled for rendering the modulating valve operative and inoperative to control the heating medium, a second controller responsive to the level of refrigerant in the evaporator for operating the modulating valve to supply steam to the heating chamber at a rate inversely proportional to the amount of refrigerant in the evaporator, and a third controller responsive to the temperature of steam escaping through the vent from the generator to modify the regulation of the valve by the second controller to prevent the escape of steam from the heating chamber.

9. In an absorption refrigeration system, a generator, a condenser, an evaporator, an absorber, conduits interconnecting the elements to provide circuits for the circulation of refrigerant and absorbent, an auxiliary circuit including a pump for recirculating refrigerant in the evaporator, an auxiliary circuit including a pump for recirculating absorbent in the absorber, a modulating valve for regulating the amount of heat supplied to the generator, a controller responsive to the temperature of the medium to be cooled for initiating operation of the refrigerant circulating pump and rendering the modulating valve operative to regulate the supply of heating medium, a controller connected to adjust the modulating valve in accordance with the amount of refrigerant in the evaporator, and a controller responsive to the initial opening of the valve for initiating operation of the absorbent circulating pump.

10. In a vacuum type refrigeration system utilizing water as a refrigerant and a salt solution as an absorbent, a plurality of elements including a generator and evaporator interconnected for the circulation of refrigerant, said evaporator being adapted to accumulate a body of refrigerant therein, a cooling element remote from the evaporator, an auxiliary circuit connecting the cooling element and evaporator, a pump in the auxiliary circuit for circulating refrigerant in the evaporator through the cooling element, a modulating valve for regulating the amount of heat supplied to the generator to vary the amount of refrigerant expelled from solution therein, and a float operated controller responsive to the liquid level of the refrigerant in the evaporator and connected to operate the valve to supply heat to the generator at a rate inversely proportional to the amount of refrigerant in the evaporator whereby to maintain the amount of refrigerant out of solution within predetermined limits.

JOHN G. REID, JR.

REFERENCES CITED

The following references are of record in the file of this patent:

UNITED STATES PATENTS

| Number | Name | Date |
| --- | --- | --- |
| 1,414,527 | Schurtz | May 2, 1922 |
| 1,802,516 | Keyes | Apr. 28, 1931 |
| 1,865,349 | Wright | June 28, 1932 |